US010928832B2

(12) United States Patent
Yadmellat

(10) Patent No.: US 10,928,832 B2
(45) Date of Patent: Feb. 23, 2021

(54) IMPEDANCE-BASED MOTION CONTROL FOR AUTONOMOUS VEHICLES

(71) Applicant: Peyman Yadmellat, North York (CA)

(72) Inventor: Peyman Yadmellat, North York (CA)

(73) Assignee: Huawei Technologies Co., Ltd., Shenzhen (CN)

(*) Notice: Subject to any disclaimer, the term of this patent is extended or adjusted under 35 U.S.C. 154(b) by 195 days.

(21) Appl. No.: 15/720,999

(22) Filed: Sep. 29, 2017

(65) Prior Publication Data
US 2019/0101930 A1 Apr. 4, 2019

(51) Int. Cl.
G05D 1/02 (2020.01)
B60W 30/00 (2006.01)
G05D 1/00 (2006.01)

(52) U.S. Cl.
CPC ........... *G05D 1/0276* (2013.01); *B60W 30/00* (2013.01); *G05D 1/0088* (2013.01); *G05D 1/0214* (2013.01); *G05D 1/0236* (2013.01); *G05D 1/0246* (2013.01); *G05D 2201/0213* (2013.01)

(58) Field of Classification Search
CPC .................................................... G05D 1/0276
See application file for complete search history.

(56) References Cited

U.S. PATENT DOCUMENTS

| | | | | |
|---|---|---|---|---|
| 2004/0090319 A1* | 5/2004 | Kimura | ............... | G08G 1/167 340/435 |
| 2005/0149251 A1* | 7/2005 | Donath | ............... | G01C 21/26 701/532 |
| 2009/0088925 A1* | 4/2009 | Sugawara | ............... | B60W 30/12 701/41 |
| 2012/0221168 A1* | 8/2012 | Zeng | ............... | G08G 1/16 701/1 |
| 2013/0325241 A1 | 12/2013 | Lombrozo et al. | | |
| 2014/0318229 A1* | 10/2014 | Tagami | ............... | G01M 17/007 73/117.01 |
| 2018/0111612 A1* | 4/2018 | Jiang | ............... | B60W 30/18163 |

FOREIGN PATENT DOCUMENTS

| | | |
|---|---|---|
| CN | 102591332 A | 7/2012 |
| CN | 105974917 A | 9/2016 |
| CN | 106272411 A | 1/2017 |
| CN | 107438873 A | 12/2017 |
| DE | 102016000493 A1 | 7/2017 |

OTHER PUBLICATIONS

Schiller, B., Morellas, V., & Donath, M. (Oct. 1998), "Collision Avoidance for Highway Vehicles Using the Virtual Bumper Controller", In Proceedings of the IEEE International Symposium on Intelligent Vehicles (pp. 149-155).
Gorjestani, A., Shankwitz, C., & Donath, M. (2000), "Impedance Control for Truck Collision Avoidance", In Proceedings of the American Control Conference, 2000, (vol. 3, pp. 1519-1524), IEEE.

* cited by examiner

Primary Examiner — Nicholas K Wiltey
Assistant Examiner — Tiffany K Luu

(57) ABSTRACT

Methods and systems for controlling motion of a vehicle. Sensor data is obtained, representing an environment of the vehicle. A reference control trajectory is corrected, using one or more virtual forces, to provide a desired trajectory. The one or more virtual forces are generated by applying an impedance scheme to the sensor data. A desired trajectory is outputted for controlling the vehicle.

16 Claims, 9 Drawing Sheets

IMPEDANCE-BASED MOTION CONTROL FOR AUTONOMOUS VEHICLES

FIELD

The present disclosure is related to motion control of autonomous vehicles. In particular, the present disclosure is related to impedance-based control for autonomous vehicles.

BACKGROUND

A problem in controlling autonomous vehicles is the interaction between vehicles and an environment that is unstructured and dynamic. Model-based approaches, either classical approaches or modern machine learning approaches, typically require a stable and robust prediction or estimation of the vehicle states and the surrounding environment. Such model-based approaches typically require a reliable model of the environment and of the vehicle. Acquiring such a model of the environment often requires a large collection of data, training, and verifying the model under all possible scenarios and conditions. In general, model-based approaches may result in higher performance at the cost of lack of robustness. The lack of robustness of model-based approaches may be of particular concern for autonomous vehicles that may be required to operate safely even in unpredictable or unexpected situations.

SUMMARY

The present disclosure describes example methods and systems for impedance control of an autonomous vehicle. The disclosed control methods and systems do not require any accurate model of the vehicle's dynamic state or of the environment. Instead, control may be carried out by relying on sensor data.

In some aspects, the present disclosure describes a method for controlling motion of a vehicle. The method includes obtaining sensor data representing an environment of the vehicle. The method also includes correcting a reference control trajectory, using one or more virtual forces, to provide a desired trajectory. The one or more virtual forces are generated by applying an impedance scheme to the sensor data. The method also includes outputting a desired trajectory for controlling the vehicle.

In any of the preceding aspects/embodiments, the impedance scheme may include a virtual spring and a virtual damper for generating each virtual force.

In any of the preceding aspects/embodiments, the impedance scheme may be a non-linear scheme.

In any of the preceding aspects/embodiments, the method may also include calculating one or more correction terms from the one or more virtual forces. The one or more correction terms may be calculated by applying a kinematic or empirical model of the vehicle.

In any of the preceding aspects/embodiments, the method may also include generating, based on the desired trajectory, one or more control signals for controlling motion of the vehicle.

In any of the preceding aspects/embodiments, the one or more virtual forces may be generated by: determining a virtual boundary based on the sensor data; and applying the impedance scheme to the virtual boundary.

In any of the preceding aspects/embodiments, determining the virtual boundary may include: generating a preliminary virtual boundary according to a planned path; and refining the preliminary virtual boundary to determine a final virtual boundary, according to at least one of: the sensor data or a navigational rule.

In any of the preceding aspects/embodiments, the sensor data representing the environment of the vehicle may include data representing a state of the vehicle.

In some aspects, the present disclosure describes a system for controlling motion of a vehicle. The system includes a processor configured to execute instructions to cause the system to obtain sensor data representing an environment of the vehicle. The processor is also configured to execute instructions to cause the system to correct a reference control trajectory, using one or more virtual forces, to provide a desired trajectory. The one or more virtual forces are generated by applying an impedance scheme to the sensor data. The processor is also configured to execute instructions to cause the system to output a desired trajectory for controlling the vehicle.

In any of the preceding aspects/embodiments, the impedance scheme may include a virtual spring and a virtual damper for generating each virtual force.

In any of the preceding aspects/embodiments, the impedance scheme may be a non-linear scheme.

In any of the preceding aspects/embodiments, the processor may be further configured to execute instructions to cause the system to: calculate one or more correction terms from the one or more virtual forces. The one or more correction terms may be calculated by applying a kinematic or empirical model of the vehicle.

In any of the preceding aspects/embodiments, the processor may be further configured to execute instructions to cause the system to: generate, based on the desired trajectory, one or more control signals for controlling motion of the vehicle.

In any of the preceding aspects/embodiments, the processor may be further configured to execute instructions to cause the system to generate the one or more virtual forces by: determining a virtual boundary based on the sensor data; and applying the impedance scheme to the virtual boundary.

In any of the preceding aspects/embodiments, the processor may be further configured to execute instructions to cause the system to determine the virtual boundary by: generating a preliminary virtual boundary according to a planned path; and refining the preliminary virtual boundary to determine a final virtual boundary, according to at least one of: the sensor data or a navigational rule.

In any of the preceding aspects/embodiments, the sensor data representing the environment of the vehicle may include data representing a state of the vehicle.

In some aspects, the present disclosure describes a vehicle. The vehicle includes one or more sensors for obtaining sensor data representing an environment of the vehicle. The vehicle also includes a vehicle control system for controlling motion of the vehicle. The vehicle also includes a mechanical system for effecting motion of the vehicle. The vehicle control system is configured to obtain sensor data representing an environment of the vehicle. The vehicle control system is also configured to correct a reference control trajectory, using one or more virtual forces, to provide a desired trajectory. The one or more virtual forces are generated by applying an impedance scheme to the sensor data. The vehicle control system is also configured to calculate a desired trajectory for controlling the vehicle. The vehicle control system is also configured to output control signals, according to the desired trajectory, to the mechanical system.

In any of the preceding aspects/embodiments, the impedance scheme may include a virtual spring and a virtual damper for generating each virtual force.

In any of the preceding aspects/embodiments, the vehicle control system may be further configured to: calculate one or more correction terms from the one or more virtual forces. The one or more correction terms may be calculated by applying a kinematic or empirical model of the vehicle.

In any of the preceding aspects/embodiments, the vehicle control system may be further configured to generate the one of more virtual forces by: determining a virtual boundary based on the sensor data; and applying the impedance scheme to the virtual boundary.

In any of the preceding aspects/embodiments, the vehicle control system may be further configured to determine the virtual boundary by: generating a preliminary virtual boundary according to a planned path; and refining the preliminary virtual boundary to determine a final virtual boundary, according to at least one of: the sensor data or a navigational rule.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes example methods and systems for non-model based impedance control of an autonomous vehicle. Non-model based approaches do not require any model of the environment, and typically result in greater ability to accommodate a dynamic and highly variable environment, compared to model-based approaches. The disclosed control methods and systems do not require any accurate model of the vehicle's dynamic state or of the environment. Instead, control may be carried out by relying on sensor data.

Although examples described herein refer to a car as the autonomous vehicle, the teachings of the present disclosure may be implemented in other forms of autonomous vehicles including, for example, trucks, buses, boats, aircraft, warehouse equipment, construction equipment or farm equipment, and may include vehicles that do not carry passengers as well as vehicles that do carry passengers. The methods and systems for navigation control disclosed herein may also be suitable for implementation in non-vehicular mobile robots, for example autonomous vacuum cleaners and lawn mowers.

Figure 1:
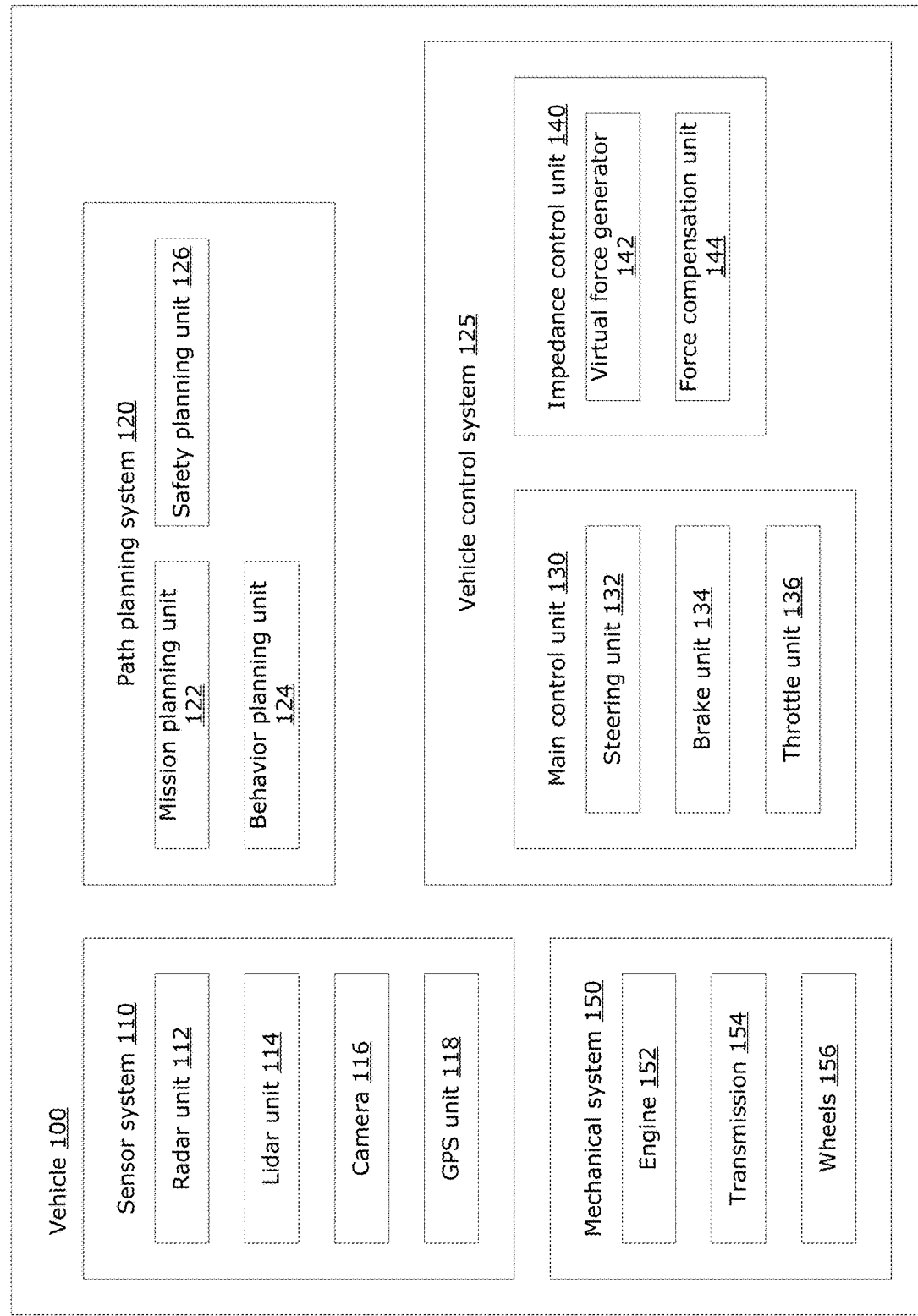
FIG. 1 is a block diagram showing components of an example autonomous vehicle.

FIG. 1 is a block diagram illustrating certain components of an example autonomous vehicle 100. Although described as being autonomous, the vehicle 100 may be operable in a fully-autonomous, semi-autonomous or fully user-controlled mode. In the present disclosure, the vehicle 100 is described in the embodiment of a car, however the present disclosure may be implemented in other vehicular or non-vehicular machines. The vehicle 100 includes a sensor system 110, a path planning system 120, a vehicle control system 125 and a mechanical system 150, for example. Other systems and components may be included in the vehicle 100 as appropriate. The sensor system 110 may communicate with the path planning system 120 and the vehicle control system 125, the path planning system 120 may communicate with the vehicle control system 125, and the vehicle control system 125 may communicate with the mechanical system 150. Other communications between systems and components may also take place in the vehicle 100.

The sensor system 110 includes various sensing units for collecting information about the environment of the vehicle 100. In the example shown, the sensor system 110 includes a radar unit 112, a LIDAR unit 114, a camera 116 and a global positioning system (GPS) unit 118. The camera 116 may capture static and/or video optical images, for example. Using the appropriate sensing unit 112, 114, 116, 118, the sensor system 110 may collect information about the local environment of the vehicle 100 (e.g., any immediately surrounding obstacles) as well as information from a wider vicinity (e.g., the radar unit 112 and LIDAR unit 114 may collect information from an area of up to 100 m radius around the vehicle 100). The sensor system 110 may also collect information about the position and orientation of the vehicle 100 relative to a frame of reference (e.g., using the GPS unit 118). The sensor system 110 may further collect information about the vehicle 100 itself. In such a case, the vehicle 100 may itself be considered part of the sensed environment. For example, the sensor system 110 may collect information from sensing units (e.g., accelerometers), which may or may not be part of the sensor system 110, to determine the state of the vehicle 100, such as linear speed, angular speed, acceleration and tire grip of the vehicle 100.

In some examples, the sensor system 110 may include or may communicate with an object recognition system (not shown) to identify any sensed objects, for example to identify a stop sign or a traffic light. The sensor system 110 communicates information from the sensed environment (including information about the vehicle 100 in some cases) to the path planning system 120 and vehicle control system 125. The sensor data provided by the sensor system 110 may be provided as raw data collected by the sensor system 110, or may have been processed by the sensor system 110. For example, the sensor system 110 may process data collected from the radar unit 112, LIDAR unit 114 and camera 116 to determine the location and dimensions of an obstacle, and provide this processed data to the path planning system 120 and vehicle control system 125. The sensor system 110 may further process the sensor data to identify the obstacle, for example to identify a stop sign, and provide this identification data to the path planning system 120 and vehicle control system 125. The sensor system 110 may also detect drivable ground (e.g., paved roadway) that the vehicle 100 can drive on. The sensor system 110 may repeatedly (e.g., in regular intervals) receive information from its sensing units in real-time. The sensor system 110 may in turn provide sensor data in real-time or near real-time.

The path planning system 120 carries out path planning for the vehicle 100. For example, the path planning system 120 may plan a path for the vehicle 100 to travel from a starting point to a target destination, using information from the GPS unit 118. The path planning system 120 may be implemented as one or more software modules or control blocks carried out by one or more processors in the vehicle 100. In the example shown, the path planning system 120 includes a mission planning unit 122, a behaviour planning unit 124 and a safety planning unit 126. Each of these units 122, 124, 126 may be implemented as software modules or control blocks within the path planning system 120. The result of path planning by the units 122, 124, 126 may be communicated among each other and may also be communicated to the vehicle control system 125, as discussed further below.

The mission planning unit 122 may define the route to be traveled by the vehicle 100, the drivable road and the general direction of motion of the vehicle 100. The behavior planning unit 124 may define high-level vehicle behavior, such as based on consideration of traffic regulations in the sensed environment. Vehicle behavior defined by the behavior planning unit 124 may include, for example, lane changes, lane keeping, turning at intersections or stopping at stop signs, among others. The safety planning unit 126 ensures collision avoidance and meeting other safety requirements. In some examples, safety planning may be referred to as part of motion planning. Although illustrated as three separate components, the mission planning unit 122, behaviour planning unit 124 and safety planning unit 126 may be implemented in fewer or greater number of components. For example, a single computing unit may carry out all the functions of the units 122, 124, 126 using a single software module. Generally, the functions of the path planning system 120 may be carried out by a single processor or may be spread over two or more processors.

The output from the path planning system 120 includes a set of data defining one or more planned paths and/or a virtual boundary as discussed further below. The path planning carried out by the path planning system 120 is performed in real-time or near real-time, to enable the vehicle 100 to be responsive to real-time changes in the environment. The data defining the planned path(s) and/or virtual boundary is communicated to the vehicle control system 125.

The vehicle control system 125 serves to control operation of the vehicle 100. The vehicle control system 125 may be used to provide full, partial or assistive control of the vehicle 100. In the example shown, the vehicle control system 125 includes a main control unit 130 and an impedance control unit 140.

The main control unit 130 may serve to directly control operation of the mechanical system 150. For example, the main control unit 130 may include a steering unit 132, a brake unit 134 and a throttle unit 136. Each of these units 132, 134, 136 may be implemented as software modules or control blocks within the main control unit 130 or more generally within the vehicle control system 125. The units 132, 134, 136 generate control signals to control the steering, braking and throttle, respectively, of the vehicle 100. The main control unit 130 may include additional components to control other aspects of the vehicle 100 including, for example, control of turn signals and brake lights.

The impedance control unit 140 may serve as a complementary or secondary control system for the main control unit 130, as discussed further below. In the example shown, the impedance control unit 140 includes a virtual force generator 142 and a force compensation unit 144. Each of these units 142, 144 may be implemented as software modules or control blocks within the impedance control unit 140 or more generally within the vehicle control system 125. The impedance control unit 140 may provide correction term(s) that is used to generate input to the main control unit 130, as discussed further below. Although illustrated as two separate components, the virtual force generator 142 and the force compensation unit 144 may be implemented in fewer or greater number of components. For example, a single computing unit may carry out all the functions of the units 142, 144 using a single software module.

The mechanical system 150 receives control signals from the vehicle control system 125 to operate the mechanical components of the vehicle 100. The mechanical system 150 effects physical operation of the vehicle 100. In the example shown, the mechanical system 150 includes an engine 152, a transmission 154 and wheels 156. The engine 152 may be a gasoline-powered engine, an electricity-powered engine, or a gasoline/electricity hybrid engine, for example. Other components may be included in the mechanical system 150, including, for example, turn signals, brake lights, fans and windows.

The vehicle 100 may include other components that are not shown, including, for example, a user interface system and a wireless communication system. These other components may also provide input to and/or receive output from the above-described systems. The vehicle 100 may also communicate with an external system, for example an external map database.

The sensor system 110, path planning system 120 and the vehicle control system 125 may be individually or in combination be realized, at least in part, in one or more computing units of the vehicle 100. For example, the vehicle 100 may include a computing unit having one or more physical processors (e.g., a microprocessor, microcontroller, digital signal processor, field programmable gate array, or application specific integrated circuit) coupled to one or more tangible memories (not shown). A processor may also be referred to as a processing unit or a controller. The memory (ies) may store instructions, data and/or software modules for execution by the processor(s) to carry out the functions of the systems 110, 120, 125. The memory(ies) may store other software instructions and data for implementing other operations of the vehicle 100. Each memory may include any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. The systems 110, 120, 125, 150 may communicate wirelessly or in a wired fashion.

Figure 2:
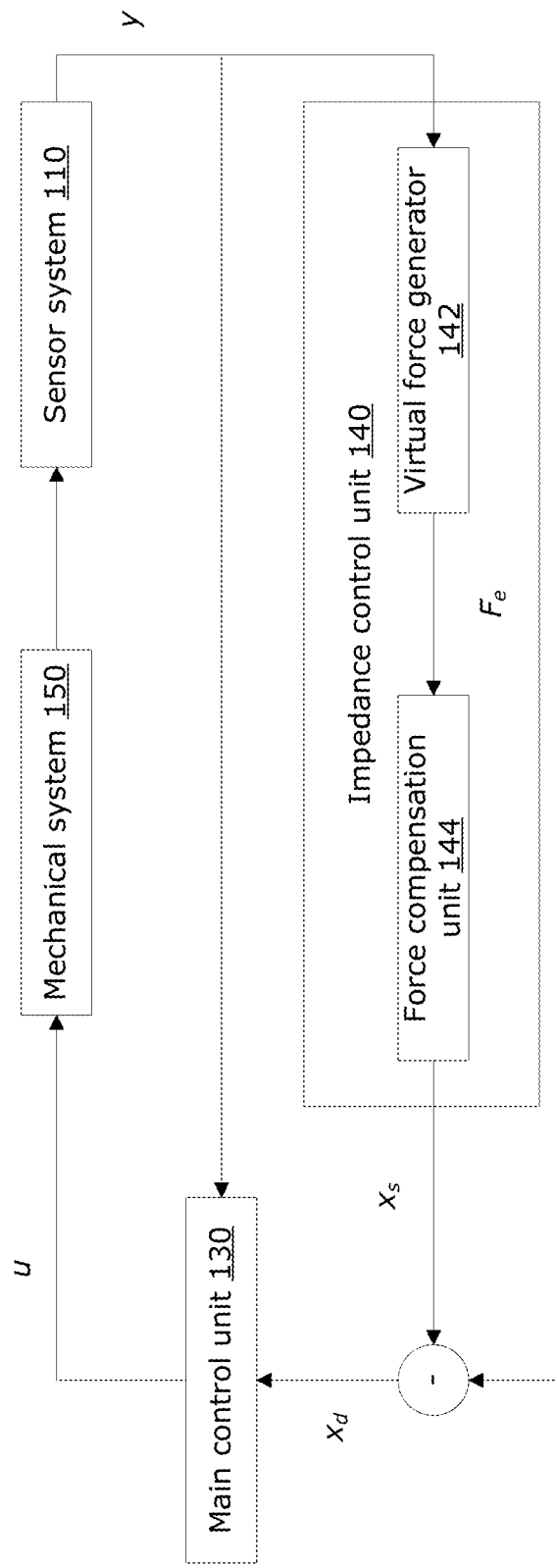
FIG. 2 is a block diagram showing an example control loop for an autonomous vehicle.

FIG. 2 illustrates an example control loop that may be used for controlling the vehicle 100 using the main control unit 130 and the impedance control unit 140. In the example control loop, a reference control trajectory $x_r$ is provided as input, for example from the path planning system 120. The reference control trajectory $x_r$ defines the desired state of the vehicle 100. The state of the vehicle 100 may be defined by parameters such as the steering angle, steering velocity, acceleration, input braking force, speed, wheel speeds, motor revolutions per minute (RPM), position of the vehicle 100 with respect to the immediate environment (e.g., road) and/or position of the vehicle 100 in a world coordinate or map, among others. One or more parameters defining the state of the vehicle 100 may be sensed by one or more sensors of the sensor system 110.

The impedance control unit 140 generates a correction term $x_s$ that is used to generate a control desired trajectory $x_d$ where $x_d = x_r - x_s$. The control desired trajectory $x_d$ is inputted to the main control unit 130. The sensor system 110 detects the environment of the vehicle, which may include the external environment as well as the state of the vehicle itself 100, and generates sensor data y that is also inputted to the main control unit 130. The main control unit 130 is used to generate control input u for controlling the mechanical system 150. The main control unit 130 may use $x_d$ and y to generate the control input u using any suitable model-based or non-model based, classical or machine learning-based approach. For example, the main control unit 130 may implement a proportional-integral-derivative (PID) approach or any reinforcement learning-based approach. Changes in the external environment and the state of the vehicle 100, as a result of actions by the mechanical system 150, are sensed by the sensor system 110 to complete the control loop.

In some examples, the impedance control unit 140 may be used as the primary control, in which case the main control unit 130 may be omitted. The control input u may be simply the difference between the reference control trajectory $x_r$ and the correction term $x_s$, such that $u = x_d = x_r - x_s$.

The sensor data y from the sensor system 110 is also inputted to the impedance control unit 140, for example to the virtual force generator 142. The virtual force generator 142 implements an impedance scheme, for example using virtual spring-dampers (which may also be referred to as impedances), such that the output of the virtual force generator is a virtual force $F_e = f(y_b, y)$ where $f(\cdot)$ is a combination of virtual restoring spring and damping forces and $y_b$ is a virtual boundary, which may be defined by the path planning system 120 as discussed further below and which may also be at least partly defined by the virtual force generator 142 in some cases (e.g., based on predefined rules defining certain types of sensed area to be drivable or non-drivable areas). The virtual boundary $y_b$ defines the drivable area that the vehicle 100 is permitted to drive, and the definition of the virtual boundary $y_b$ may be based on physical and/or virtual driving limits, and/or path planning by the path planning system 120. In some examples, at least virtual damping forces may be generated without being based on any virtual boundary or by assuming that $\dot{y}_b$ is zero. In some examples, the virtual damping forces may be a constant (e.g., friction). For example:

$$f(y_b, y) = k(y_b - y) + b_1(\dot{y}_b - \dot{y}) - b_2 \dot{y} + b_3 \operatorname{sgn}(\dot{y})$$

where sgn( ) is a function that extracts the sign of a real number, and $b_3$ is a constant frictional coefficient.

The virtual force $F_e$ may be generated based on an impedance scheme selected from one or more available impedance schemes, including linear and/or non-linear impedances. A simple function for generating the virtual force $F_e$ may be a linear summation of spring-damping forces, which may be expressed as $$f(y_b, y) = K(y_b - y) + b(\dot{y}_b - \dot{y})$$

where K is the virtual spring constant and b is the virtual damping constant. The values for the virtual spring constant and the virtual damping constant may be selected to achieve a desired vehicle response to surrounding environments. For example, selecting a stiffer virtual spring constant (i.e., higher value of K) results in the vehicle 100 being controlled to be more sensitive to proximity of the virtual boundary and/or obstacles; selecting greater damping (i.e., higher value of b) results in the vehicle 100 being controlled to have a more gradual change in speed. The use of a damping force may also result in a control approach that is less sensitive to accuracy and precision of the sensed data from the sensor system 110. Other linear or non-linear impedance schemes for generating the virtual force $F_e$ may be used.

An example of linear impedance is:

$$F_e = Kx + b\dot{x} + c,$$

where K is the spring constant, b is the damping constant, and c is a constant.

Examples of non-linear impedance include any combination of non-linear spring force $F_s$ and/or non-linear damping force $F_d$, for example the following non-linear spring forces (among others):

Exponential spring: $F_s = K_1 e^{K_2 x}$ where $K_1$ and $K_2$ are spring constants.

Non-ideal constant force spring:

$$F_s = \begin{cases} Kx & \text{if } x \leq x_{max} \\ c & \text{if } x > x_{max} \end{cases}$$

where c is a constant

Backlash:

$$\dot{F}_s = \begin{cases} k_1 & \text{if } \dot{x} > 0 \\ k_2 & \text{if } \dot{x} < 0 \\ 0 & \text{otherwise} \end{cases}$$

Linear spring with dead-zone:

$$F_s = \begin{cases} 0 & \text{if } x < d \\ K(x-d) & \text{if } x \geq d \end{cases},$$

where d is the dead-zone.

Example non-linear damping forces include (among others): Linear damper with dead-band:

$$F_d = \begin{cases} 0 & \text{if } \dot{x} < d \\ b\dot{x} & \text{if } \dot{x} \geq d \end{cases},$$

where d is the dead-band.

Non-linear viscous damper: $F_d = b\dot{x}^n$, where n is a positive number.

Coulomb friction: $F_d = c \operatorname{sgn}(\dot{x})$, where c is a constant.

The impedance scheme (and hence function f) selected for generating the virtual force $F_e$ may change dynamically, for example in order to meet different desired goals for controlling the vehicle 100. For example, the function that is used to control for driving on a highway may be different from the function that is used for driving in a parking lot. In some examples, whether or not the impedance scheme changes, the value of the spring constant and/or damping constant may be time-dependent or adjusted adaptively, depending on the desired behavior of the vehicle, sensed external condition or other predefined rule.

The virtual boundary $y_b$ may also be dynamically generated and changed in order to meet a desired goal and/or to cause the vehicle 100 to head in a certain direction.

The force compensation unit 144 serves to translate the virtual force $F_e$ into components that can be compared to the reference control trajectory $x_r$. For example, the force compensation unit 144 may serve to project the force vectors of the virtual force $F_e$ to force components normal and tangential to the main axis (i.e., longitudinal or front-to-rear axis) of the vehicle 100, where the normal components are used as the basis for controlling the steering trajectory and the tangential components are used as the basis for controlling the speed trajectory. To ensure a smooth movement, the normal components may also be used to control the speed trajectory. The kinematics of the vehicle 100 may also be used to design the force compensation unit 144. The kinematics of the vehicle 100 describe the relationship between changes in steering and speed of the vehicle 100 and the resulting changes in the physical position of the vehicle 100. Unlike a dynamic model, a kinematic model is a static model of the vehicle 100 and is generally always available with a sufficient degree of accuracy. Non-model based control, in the present disclosure and for control systems in general, refers to control approaches that do not use dynamic model of the system in designing the controller.

An example operation of the control loop of FIG. 2 is now described. In this example, the input from the path planning unit 120 is to control the position of the vehicle 100 to be preferably in the middle of a lane and the speed of the vehicle 100 to be preferably at 100 km/h. This may be expressed by the reference control trajectory $x_r=[0,100]^T$. Assume there is another vehicle in front of the vehicle 100 that is detected by the sensor system 110. The sensor system 110 generates sensor data y that indicates the other vehicle is at a distance d from the front of the vehicle 100.

Based on the sensor data y, and assuming that the sensor range is 100 m, the virtual force $F_e$ generated by the virtual force generator 142 can be defined as $F_e=[0,k(100-d)]$ where k is the spring constant and the damping constant is 0. Here, the corrective force generated by the virtual force generator increases linearly as the distance between the vehicle 100 and the sensed object decreases, in order to adjust the desired speed based on the distance to the sensed object. The virtual force $F_e$ is translated to the correction term $x_s$ by the force compensation unit 144 using kinematics of the vehicle 100 or empirically. Any suitable kinematic model of a vehicle may be used. If determined empirically, trial-and-error may be used to find an appropriate relationship between $F_e$ and $x_s$. For example, the force compensation unit 144 may generate $x_s=\alpha F_e$, where $\alpha$ is a mapping coefficient. The mapping coefficient may be determined using the kinematic model of the vehicle, or if using an empirical method by using a predefined ratio between the maximum virtual force and maximum correction term (i.e., $\alpha=F_{e\_max}/x_{s\_max}$). In an example, if d=50 m, k=1 and $\alpha$=0.1, then the result is the correction term $x_s=[0,5]$. The control desired trajectory $x_d$ is then $x_d=x_r-x_s=[0,95]^T$. Thus, the main control unit 130 receives 95 km/h as the target speed instead of 100 km/h. In this example, the impedance control unit 140 changes the target speed to avoid collision with the other vehicle, using a virtual impedance in front of the vehicle 100 to generate a virtual resistive force in the backward direction.

Figure 3:
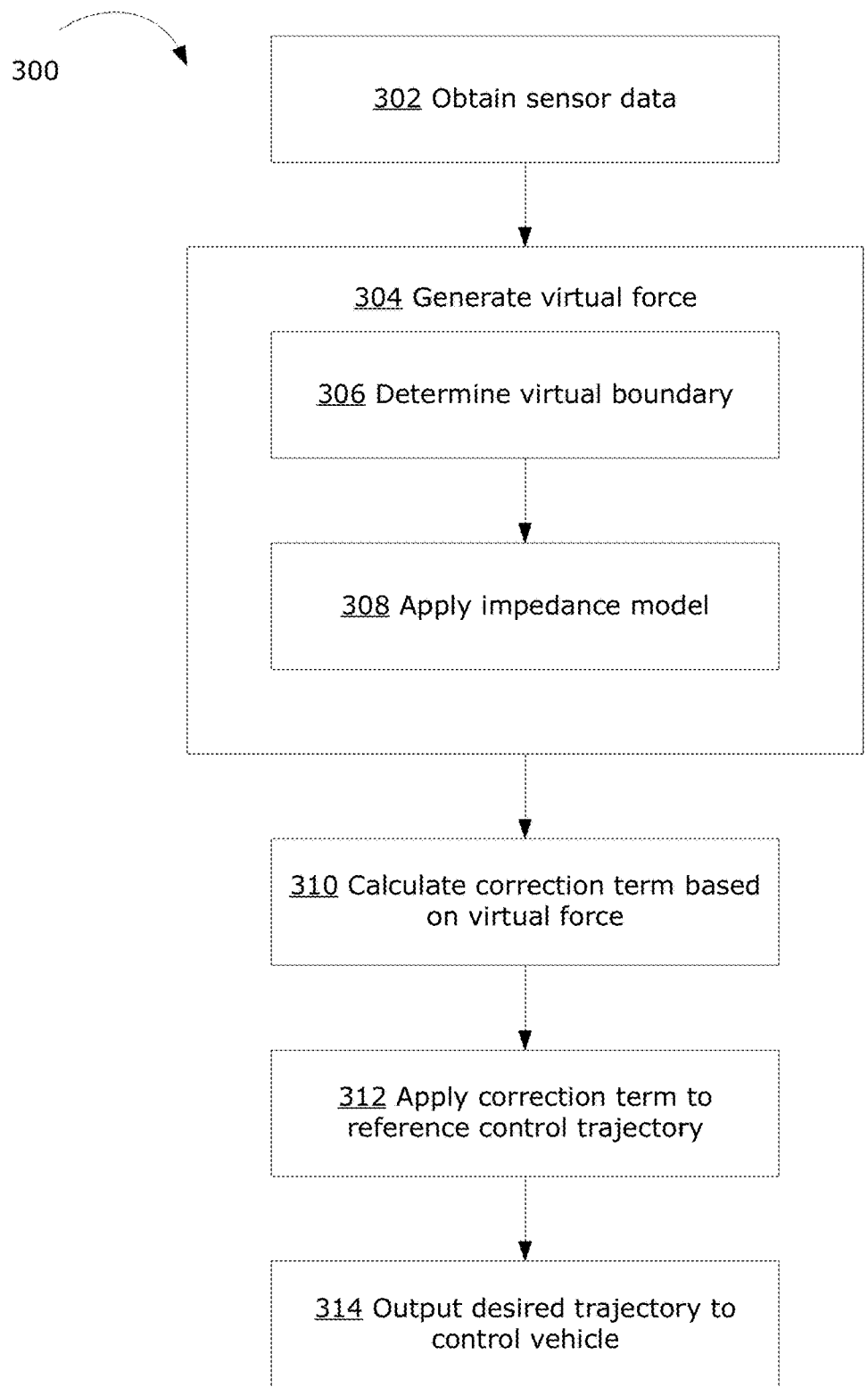
FIG. 3 is a flowchart illustrating an example method for impedance control for an autonomous vehicle.

FIG. 3 is a flowchart illustrating an example method 300 for controlling an autonomous vehicle using impedance control. The example method 300 may be at least partially carried out by the vehicle control system 125 (e.g., using the main control unit 130 and the impedance control unit 140) of the autonomous vehicle 100, for example. In some examples, the path planning system 120 may cooperate with the vehicle control system 125 to perform the method 300. The method 300 may be carried out using any suitable processor. For the purpose of illustration, the method 300 will be discussed below with reference to the examples shown in FIGS. 1 and 2; however, it should be understood that the method 300 is not limited to these embodiments.

At 302, sensor data is obtained. For example, the sensor system 110 may sense sensor data y from the environment of the vehicle 100 (e.g., external surrounding environment and/or state of the vehicle 100 itself). Sensor data y may provide information about the state of the vehicle 100 in terms of state parameters (e.g., the steering angle, steering velocity, acceleration, input braking force, speed, wheel speeds, motor RPM, position of the vehicle 100 with respect to the immediate environment and/or position of the vehicle 100 in a world coordinate or map). Sensor data y providing information about the external environment may be obtained from various sensor units (e.g., radar unit 112, LIDAR unit 114, camera 116 or GPS unit 118). The sensor data y may be provided to the path planning system 120 and the vehicle control system 125. The sensor data y obtained at 302 may be raw data from the sensor units or may be processed data.

At 304, one or more virtual forces are generated. Generation of the virtual force(s) may be based on determination of a virtual boundary and applying an impedance scheme to the virtual boundary, as discussed above.

At 306, the virtual boundary is determined. The virtual boundary may be determined based on information (e.g., from sensor system 110) about the sensed environment (e.g., road edges, lane boundaries, pedestrians, other vehicles, other obstacles, intersections, construction or other sensed objects), navigation rules (e.g., lane changes, turning at an intersection, decision at a traffic light or stop sign or other such vehicle behaviors) stored and/or defined by the path planning system 120, or combinations thereof.

The virtual boundary may be defined by the path planning system 120, using information from the sensor system 110 (e.g., optical images, LIDAR signal, radar signal and/or GPS data). The maximum range of sensors or other limits to sensed data (e.g., occlusions, dead-angles and/or corrupted data) may also be used to form all or part of the virtual boundary. For example, the virtual boundary may be defined so that it does not exceed the maximum range of the sensor system 110.

As illustrated by examples disclosed herein, different virtual boundaries may be determined for controlling the vehicle 100 for different desired behaviors according to the path planning system 120. The determined virtual boundary may be provided to the impedance control unit 140 for generation of the virtual force(s).

At 308, an impedance scheme is applied to the virtual boundary. The impedance scheme defines the linear or non-linear function used to generate one or more virtual forces $F_e$ that serve to bias the vehicle 100 away from the virtual boundary. The impedance scheme may further define the number and direction of virtual forces $F_e$ that should be generated. The impedance control unit 140 may determine the appropriate impedance scheme to use based on the desired vehicle behavior.

The virtual force(s) $F_e$ may then be generated (e.g., by the virtual force generator 142) based on the sensed state of the vehicle 100 relative to the virtual boundary and using the impedance scheme. The virtual force(s) $F_e$ may be expressed as a scalar value or a vector, for example.

At 310, at least one correction term is calculated based on the virtual force(s). Calculation of the correction term $x_s$ may be performed by the impedance control unit 140, for example using the force compensation unit 144 to relate the normal and tangential components of the virtual force(s) to the steering and speed trajectories, based on a kinematic model.

The correction term $x_s$ may be a scalar value or a vector, depending on the kinematic or empirical model used for control of the vehicle 100, for example. Generally, the format of the correction term $x_s$ may correspond to the format of the reference control trajectory. The correction term $x_s$ may serve to adjust the reference control trajectory to control the vehicle 100 according to the sensed environment and desired behavior.

At 308, the correction term(s) is(are) applied to the reference control trajectory. The reference control trajectory may define the desired state of the vehicle 100 (e.g., desired speed), according to the path planning system 120 for example. For example, the correction term $x_s$ may be subtracted from the reference control trajectory $x_r$ to obtain the desired trajectory $x_d$ for controlling the vehicle 100. This operation may be performed by any suitable sub-unit of the vehicle control system 125, for example the impedance control unit 140 may calculate the desired trajectory $x_d$. The desired trajectory $x_d$ defines the desired state of the vehicle 100 to be achieved by controlling the motion of the vehicle 100.

At 310, the desired trajectory is outputted to control motion of the vehicle. For example, the impedance control unit 140 may provide the desired trajectory $x_d$ to the main control unit 130 to control motion of the vehicle 100. The desired trajectory $x_d$ may be used by the main control unit 130 to generate appropriate control signals to control the mechanical system 150 of the vehicle 100, to attain the desired trajectory.

It should be understood that although the method 300 is illustrated as a flowchart, the method 300 may be implemented as part of a control feedback loop, for example as illustrated in FIG. 2.

Figure 4C:
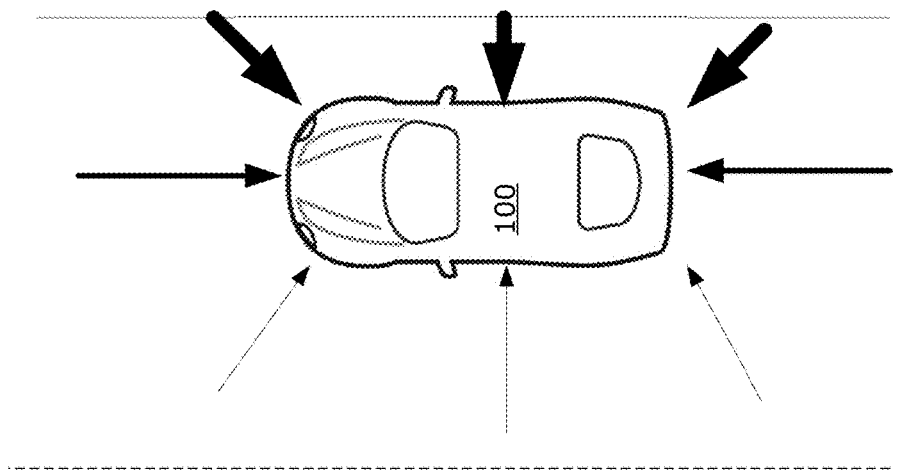
FIGS. 4A-4C are diagrams illustrating virtual forces for impedance control of an autonomous vehicle in a lane keeping scenario.
Figure 4B:
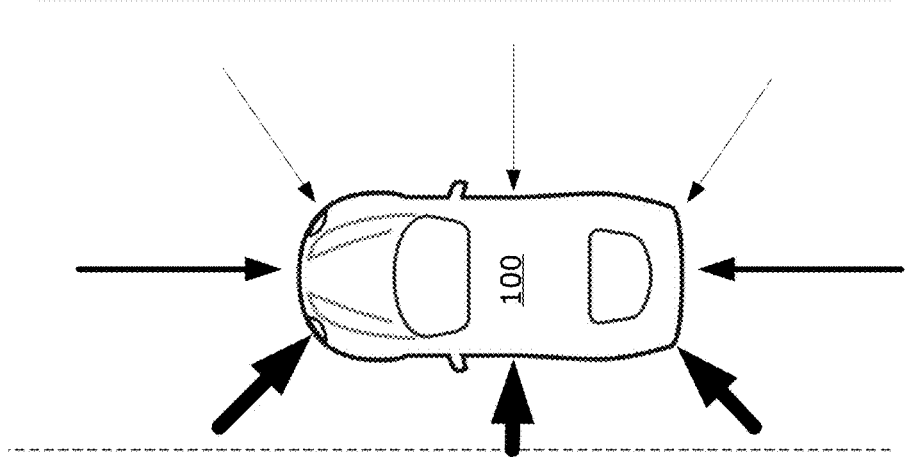
Figure 4A:
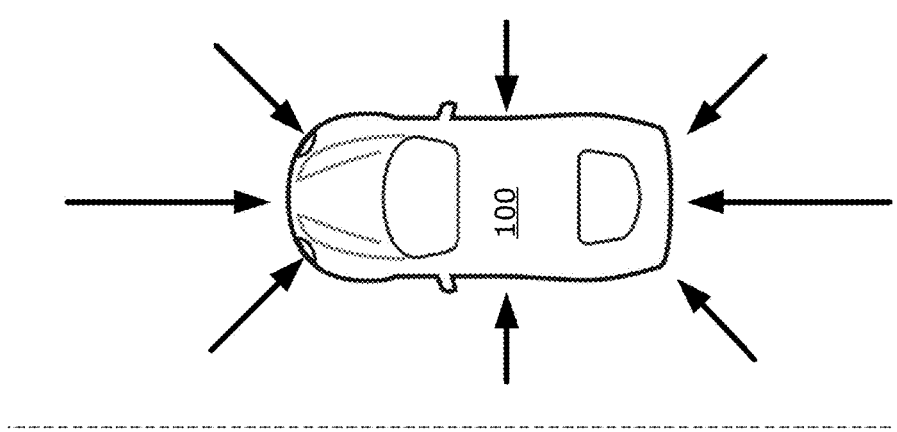

FIGS. 4A-4C illustrate an example of how impedance control may be used to control a vehicle within lane boundaries, using virtual forces. In this example, the virtual boundary may be defined by sensed lane boundaries (e.g., detected by the sensor system 110). For example, in the path planning system 120, the behavior planning unit 124 may use a navigation rule (e.g., rule to stay in the middle of the lane) to define the lane boundaries on either side of the vehicle 100 as the virtual boundary. The front and rear virtual boundaries may be defined depending on sensed objected at the front and rear of the vehicle 100. In FIGS. 4A-4C, the virtual forces generated by the impedance control unit 140 are shown as force vectors (represented by arrows). The force vectors vary in magnitude from a high value (large arrow) to zero (small arrow). The virtual forces generated by the impedance control unit 140 result in the vehicle 100 being controlled to be in the middle of the lane where all the virtual forces are balanced (see FIG. 4A). Balancing the force vectors may be achieved by controlling the state of the vehicle 100 (e.g., as described with respect to the control loop of FIG. 2), via control signals from the main control unit 130 such as the steering unit 132, braking unit 134 and/or throttle unit 136.

Figure 5C:
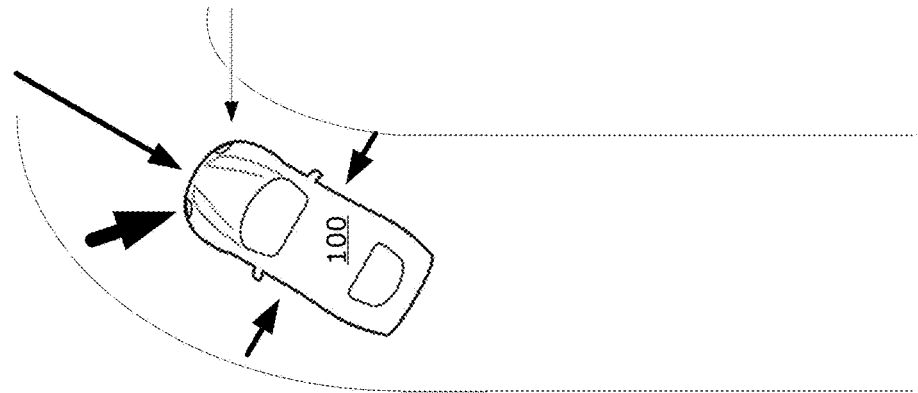
FIGS. 5A-5C are diagrams illustrating virtual forces for impedance control of an autonomous vehicle when making a turn.
Figure 5B:
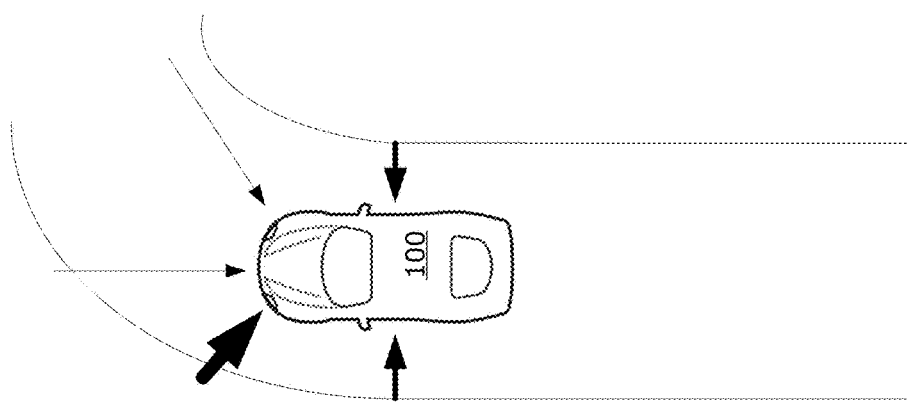
Figure 5A:
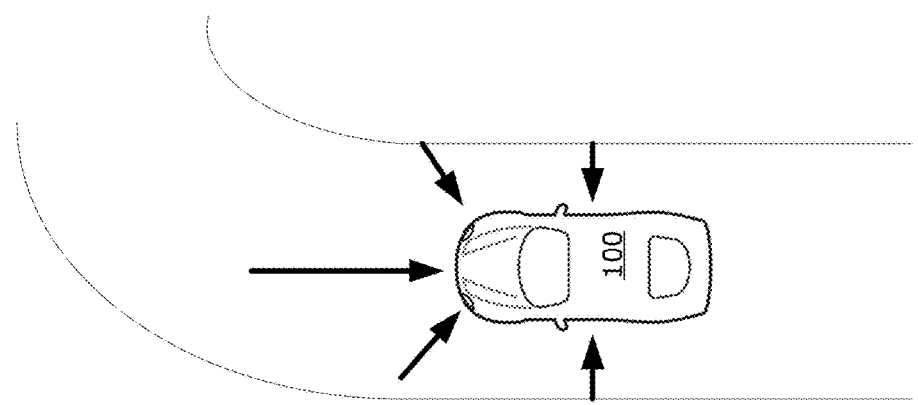

FIGS. 5A-5C illustrate another example of how impedance control may be used to control a vehicle within lane boundaries, using virtual forces. In this example, the lane curves. The virtual boundary may be defined by sensed lane boundaries (e.g., detected by the sensor system 110). The number of virtual forces used by the impedance control unit 140 in this example is fewer than that illustrated in the example of FIGS. 4A-4C, according to a different impedance scheme. For example, in the path planning system 120, the behavior planning unit 124 may use a navigation rule (e.g., rule to stay in the middle of the lane) to define the lane boundaries on either side of the vehicle 100 as the virtual boundary and further instruct the impedance control unit 140 to use an impedance scheme suitable for controlling a turning vehicle 100. The virtual forces generated by the impedance control unit 140 are shown as force vectors (represented by arrows). The force vectors vary in magnitude from a high value (large arrow) to zero (small arrow). The virtual forces generated by the impedance control unit 140 result in the vehicle 100 being controlled to turn, following the lane. Balancing the force vectors may be achieved by controlling the state of the vehicle 100 (e.g., as described with respect to the control loop of FIG. 2), via control signals from the main control unit 130 such as the steering unit 132, braking unit 134 and/or throttle unit 136.

FIGS. 6A-6D illustrate an example of how impedance control may be used to control a vehicle in a lane change scenario. FIGS. 6A-6D also illustrate how the virtual boundary may be defined by the path planning system 120. Generally, the virtual boundary (in this example as well as other examples) may be generated by the path planning unit 120, such as by the units 122, 124, 126 adjusting the virtual boundary amongst themselves in a hierarchical fashion. That is, the behavior planning unit 124 adjusts the virtual boundary outputted by the mission planning unit 122 and outputs the result to the safety planning unit 126; and the safety planning unit 126 adjusts the virtual boundary outputted by the behavior planning unit 124 and outputs the result to the impedance control unit 140. One way of representing drivable area is to use an occupancy grid map (OGM), with each unit 124, 126 refining the OGM generated by the higher planning hierarchy.

Figure 6A:
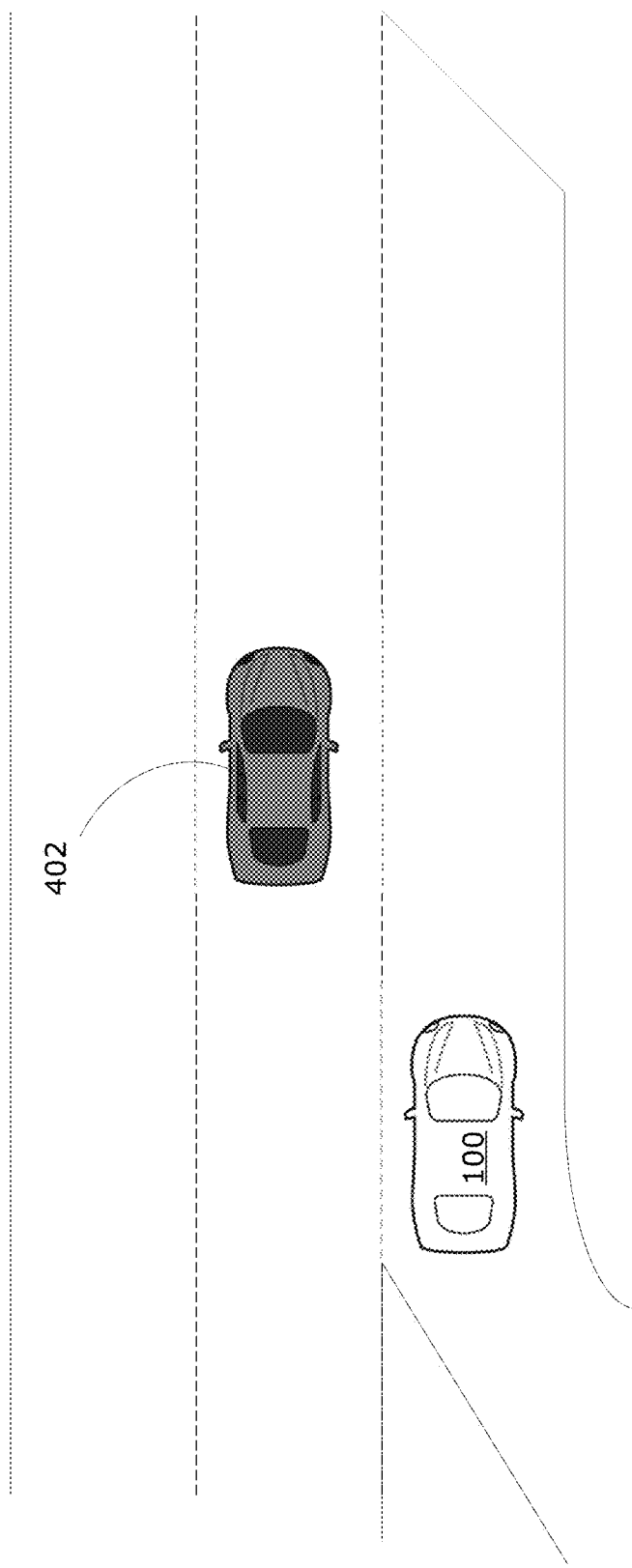
FIGS. 6A-6D are diagrams illustrating determination of a virtual boundary for impedance control of an autonomous vehicle when changing lanes.
Figure 6B:
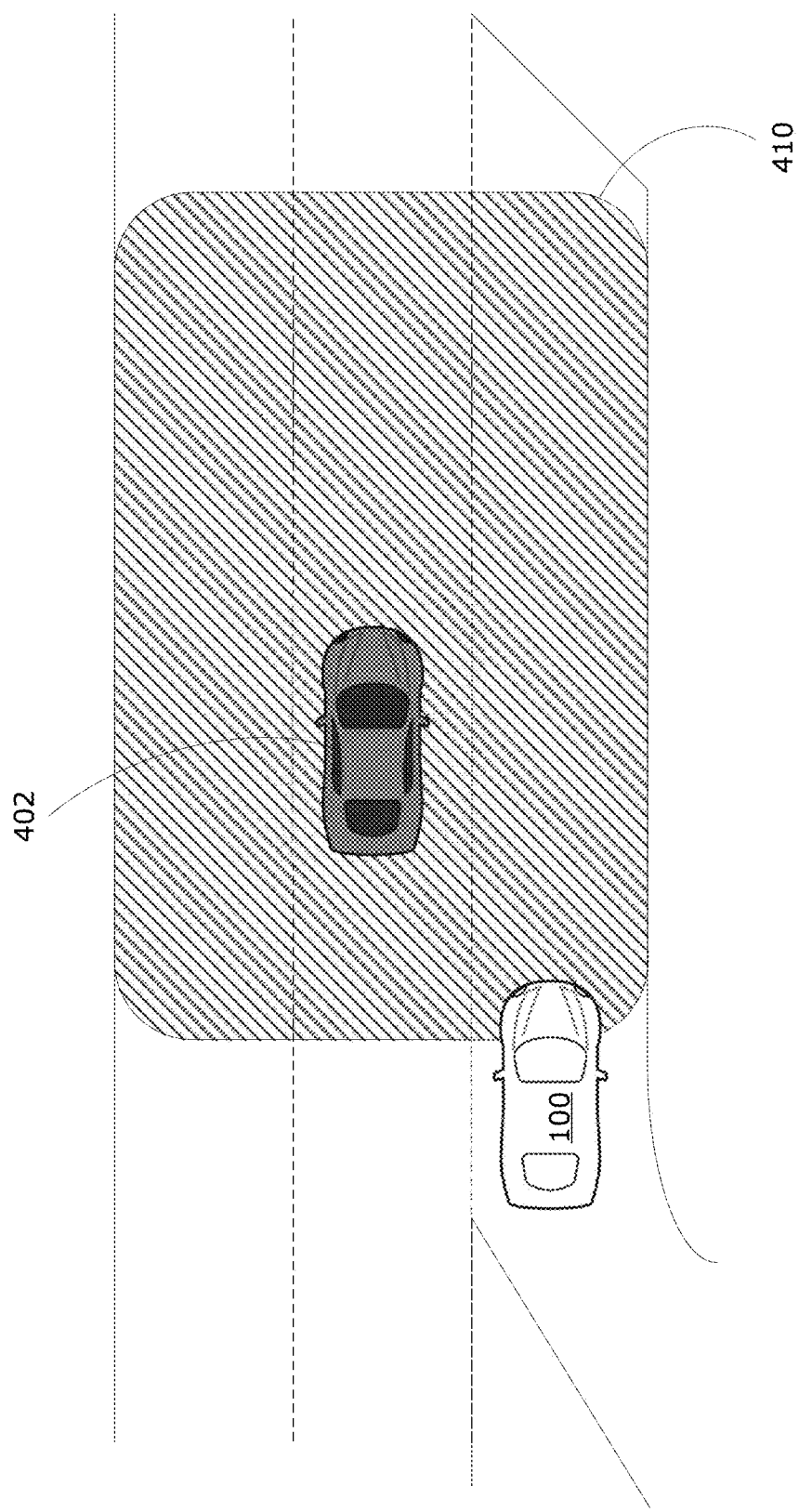
Figure 6C:
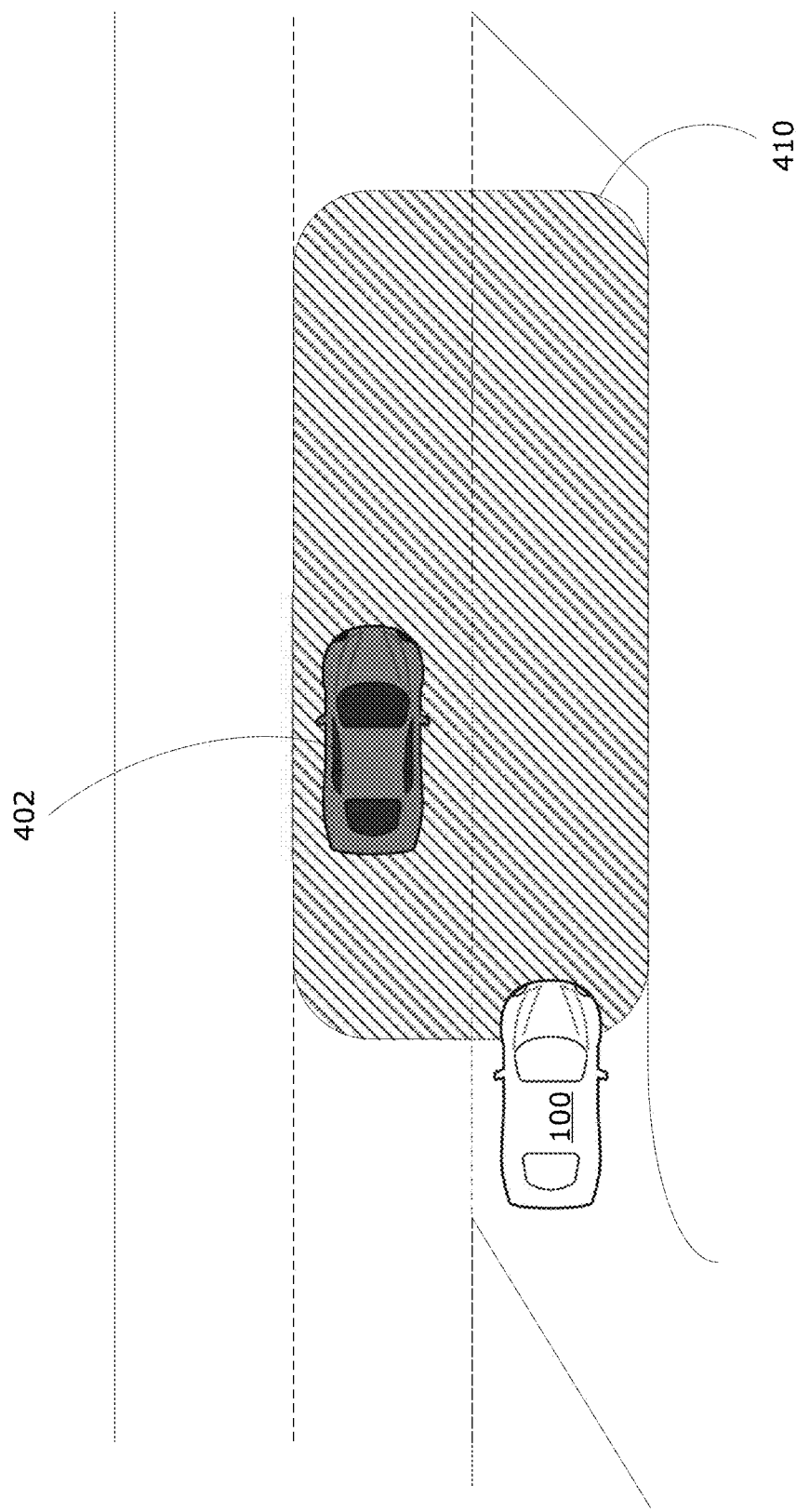
Figure 6D:
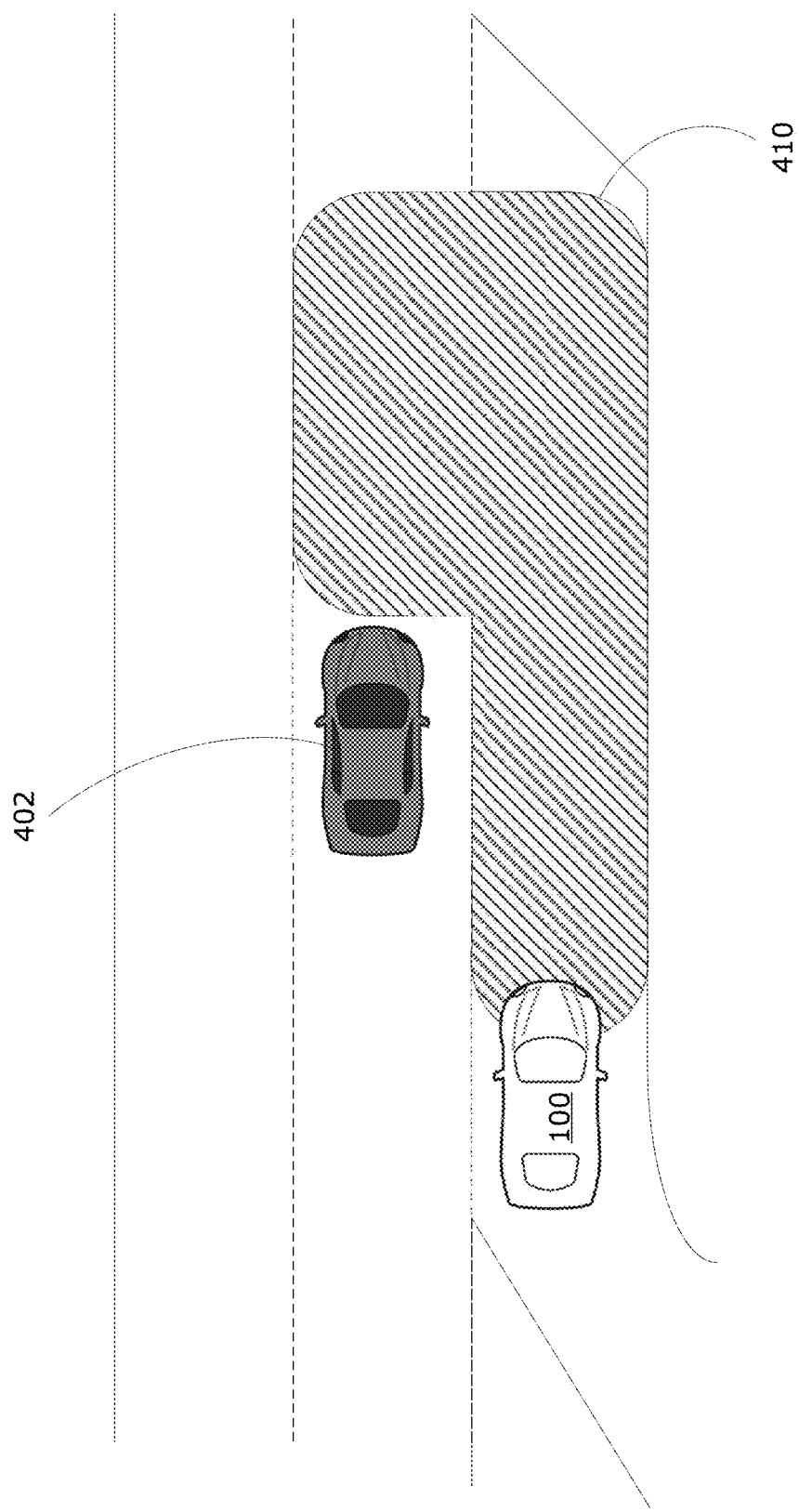

FIG. 6A illustrates the vehicle 100 in a lane change scenario, where there is another vehicle 402. The sensor system 110 detects the lane boundaries and the presence of the other vehicle 402. The mission planning unit 122 determines that the vehicle 100 should take the route that requires changing lanes. FIG. 6B illustrates the virtual boundary 410 outputted by the mission planning unit 122. The behavior planning unit 124 determines that the vehicle 100 should change to the lane immediately to its left. FIG. 6C illustrates the virtual boundary 410 after it has been refined by the behavior planning unit 124 to limit the vehicle 100 to the lane immediately to its left. The safety planning unit 126 determines that the vehicle 100 should avoid collision with the other vehicle 402. FIG. 6D illustrates the virtual boundary 410 after it has been further refined by the safety planning unit 126 to avoid colliding with the other vehicle 402. The final refined virtual boundary 410 outputted by the safety planning unit 126 is then provided to the impedance control unit 140 to generate virtual forces, as discussed above, for vehicle control.

Although a certain number and configuration (e.g., position and direction) of virtual forces are illustrated, this is provided only as an example. Further, the number, position and/or direction of the virtual forces may be changed dynamically (e.g., by selecting an appropriate impedance scheme), depending on the driving scenario (e.g., different degrees of vehicle autonomy and/or different desired vehicle behavior). The impedance control unit 140 may select the number, position and/or direction of virtual forces, based on input from the behavior planning unit 124. For example, for keeping the vehicle 100 spaced from other vehicles, there may be at least one virtual force in the front and/or rear directions of the vehicle 100 to ensure a safe gap between the vehicle 100 and other vehicles (or other obstacles) in front of and/or behind the vehicle 100. In another example, for keeping the vehicle 100 in the middle of a straight lane, there may be virtual forces perpendicular to each lateral side of the vehicle 100 to ensure equal distance between the lane boundaries on each side. In another example, for keeping the vehicle 100 in a general lane, there may be at least two virtual forces perpendicular to each lateral side of the vehicle 100, as above, and additionally at least one virtual force directed towards the front of the vehicle 100 to adjust speed. In another example, for a general completely autonomous driving scenario, there may be anywhere from three to eight (or more) virtual forces to keep the vehicle 100 at the desired position and/or speed.

By changing the virtual boundary and/or the impedance scheme, the vehicle may be controlled to exhibit desired behaviors (e.g., changing lanes, passing other vehicles, turning at an intersection, etc.) using impedance control, and without having to rely on a model or assumption about the surrounding environment. The generation of virtual forces, including determination of the virtual boundary and application of a selected impedance scheme, may occur in real-time or near real-time, to enable safe operation of the vehicle. Similarly, the virtual boundary and/or impedance scheme may be determined and changed dynamically (in real-time or near real-time) to adjust behavior of the vehicle for safe operation. It should be understood that operation of a vehicle may be highly time-sensitive, and the use of full or assistive control of the vehicle may require that time lag be minimal (e.g., no more than 100 ms). An impedance control approach may be suitable for addressing such time-sensitive operation because the relative simplicity of the approach (e.g., not requiring a model or prediction about the external environment) may require less processing power and hence be faster to implement.

In examples disclosed herein, a non-model based approach is provided for controlling an autonomous vehicle. No physical model, machine learning-based model or prediction schemes are required, but such models may be used if desired. A non-model based approach, using impedance control as disclosed herein, may provide for more robust control of the vehicle, and may be suitable even in unpredictable or unexpected situations where model-based approaches may be less reliable.

Generation of the virtual boundary used for impedance control is not reliant on any assumptions about the vehicle or its surrounding environment. The virtual boundary may be generated based on raw and/or processed sensor data, and may be generated using any suitable logic, such as a rule-based approached, a machine learning-based approach or a combination thereof.

The impedance control disclosed in the various examples may be used as an additional or complementary control to other model-based or non-model based control, for example as a secondary safety control or for redundancy.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for controlling motion of an autonomous vehicle, the method comprising:
    obtaining sensor data representing an environment of the autonomous vehicle;
    generating, by a planning system of the autonomous vehicle:
        a reference control trajectory for the autonomous vehicle, the reference control trajectory defining a reference desired state of the autonomous vehicle; and
        a virtual boundary for a desired behavior of the autonomous vehicle based on the sensor data, the virtual boundary defining a drivable area in which the autonomous vehicle is permitted to operate safely, the virtual boundary being generated by:
            generating a preliminary virtual boundary according to a planned route for the autonomous vehicle; and
            refining the preliminary virtual boundary according to a navigational rule that defines the desired behavior, to generate the virtual boundary;
    applying at least one correction term to the reference control trajectory for the autonomous vehicle to obtain a desired trajectory for the autonomous vehicle defining a corrected desired state of the autonomous vehicle, the at least one correction term being calculated from one or more virtual forces, the one or more virtual forces being generated by applying an impedance scheme to the virtual boundary;
    generating, based on the desired trajectory for the autonomous vehicle, one or more control signals for controlling the motion of the autonomous vehicle; and
    outputting the one or more control signals to a mechanical system of the autonomous vehicle for controlling the motion of the autonomous vehicle to attain the desired trajectory for the autonomous vehicle.

2. The method of claim 1, wherein the impedance scheme comprises a virtual spring and a virtual damper for generating each virtual force.

3. The method of claim 1, wherein the impedance scheme is a non-linear scheme.

4. The method of claim 1, further comprising:
calculating the one or more correction terms from the one or more virtual forces by applying a kinematic or empirical model of the autonomous vehicle.

5. The method of claim 1, wherein the sensor data representing the environment of the autonomous vehicle includes data representing a current state of the autonomous vehicle.

6. The method of claim 1, wherein the preliminary virtual boundary is generated by a mission planning unit of the planning system, and the preliminary virtual boundary is refined by a behavior planning unit of the planning system.

7. A system for controlling motion of an autonomous vehicle, the system comprising a processor configured to execute instructions of a planning system of the autonomous vehicle stored in memory to cause the system to:
obtain sensor data representing an environment of the autonomous vehicle;
generate a reference control trajectory for the autonomous vehicle, the reference control trajectory defining a reference desired state of the autonomous vehicle;
generate a virtual boundary for a desired behavior of the autonomous vehicle based on the sensor data, the virtual boundary defining a drivable area in which the autonomous vehicle is permitted to operate safely, the virtual boundary being generated by:
generating a preliminary virtual boundary according to a planned route for the autonomous vehicle; and
refining the preliminary virtual boundary according to a navigational rule that defines the desired behavior, to generate the virtual boundary;
apply at least one correction term to the reference control trajectory for the autonomous vehicle to obtain a desired trajectory for the autonomous vehicle defining a corrected desired state of the autonomous vehicle, the at least one correction term being calculated from one or more virtual forces, the one or more virtual forces being generated by applying an impedance scheme to the virtual boundary;
generate, based on the desired trajectory for the autonomous vehicle, one or more control signals for controlling the motion of the autonomous vehicle
output the one or more control signals to a mechanical system of the autonomous vehicle for controlling the motion of the autonomous vehicle to attain the desired trajectory for the autonomous vehicle.

8. The system of claim 7, wherein the impedance scheme comprises a virtual spring and a virtual damper for generating each virtual force.

9. The system of claim 7, wherein the impedance scheme is a non-linear scheme.

10. The system of claim 7, wherein the processor is further configured to execute instructions to cause the system to:
calculate the one or more correction terms from the one or more virtual forces by applying a kinematic or empirical model of the autonomous vehicle.

11. The system of claim 7, wherein the sensor data representing the environment of the autonomous vehicle includes data representing a state of the autonomous vehicle.

12. The system of claim 7, wherein the preliminary virtual boundary is generated by a mission planning unit of the planning system, and the preliminary virtual boundary is refined by a behavior planning unit of the planning system.

13. An autonomous vehicle comprising:
one or more sensors for obtaining sensor data representing an environment of the autonomous vehicle;
a planning system for generating a reference control trajectory and a virtual boundary for the autonomous vehicle;
a vehicle control system for controlling motion of the autonomous vehicle; and
a mechanical system for effecting motion of the autonomous vehicle;
wherein the planning system is configured to:
obtain sensor data representing an environment of the autonomous vehicle;
generate:
the reference control trajectory, the reference control trajectory defining a reference desired state of the autonomous vehicle; and
the virtual boundary for a desired behavior of the autonomous vehicle based on the sensor data, the virtual boundary defining a drivable area in which the autonomous vehicle is permitted to operate safely, the virtual boundary being generated by:
generating a preliminary virtual boundary according to a planned route for the autonomous vehicle; and
refining the preliminary virtual boundary according to a navigational rule that defines the desired behavior, to generate the virtual boundary;
apply at least one correction term to the reference control trajectory for the autonomous vehicle to obtain a desired trajectory for the autonomous vehicle defining a corrected desired state of the autonomous vehicle, the at least one correction term being calculated from one or more virtual forces, the one or more virtual forces being generated by applying an impedance scheme to the virtual boundary; and
generate, based on the desired trajectory for the autonomous vehicle, one or more control signals for controlling the motion of autonomous vehicle; and
output the one or more control signals to the mechanical system for controlling the motion of the autonomous vehicle to attain the desired trajectory for the autonomous vehicle.

14. The autonomous vehicle of claim 13, wherein the impedance scheme comprises a virtual spring and a virtual damper for generating each virtual force.

15. The autonomous vehicle of claim 13, wherein the vehicle control system is further configured to:
calculate the one or more correction terms from the one or more virtual forces by applying a kinematic or empirical model of the autonomous vehicle.

16. The autonomous vehicle of claim 13, wherein the preliminary virtual boundary is generated by a mission planning unit of the planning system, and the preliminary virtual boundary is refined by a behavior planning unit of the planning system.

* * * * *